(12) United States Patent
Gardell et al.

(10) Patent No.: US 12,546,258 B2
(45) Date of Patent: Feb. 10, 2026

(54) ACOUSTIC TREATMENT MADE BY ADDITIVE MANUFACTURING

(71) Applicant: Raytheon Technologies Corporation, Farmington, CT (US)

(72) Inventors: Benjamin G. Gardell, Bristol, CT (US); Michael Raymond LaFavor, Otisfield, ME (US)

(73) Assignee: RTX Corporation, Farmington, CT (US)

( * ) Notice: Subject to any disclaimer, the term of this patent is extended or adjusted under 35 U.S.C. 154(b) by 115 days.

(21) Appl. No.: 18/326,489

(22) Filed: May 31, 2023

(65) Prior Publication Data

US 2024/0401534 A1     Dec. 5, 2024

(51) Int. Cl.
| | | |
|---|---|---|
| *F02C 7/24* | (2006.01) | |
| *B32B 3/12* | (2006.01) | |
| *B32B 3/26* | (2006.01) | |
| *B32B 27/36* | (2006.01) | |

(Continued)

(52) U.S. Cl.
CPC ............... *F02C 7/24* (2013.01); *B32B 3/12* (2013.01); *B32B 3/266* (2013.01); *B32B 27/365* (2013.01); *B33Y 80/00* (2014.12); *B32B 9/047* (2013.01); *B32B 2250/03* (2013.01); *B32B 2250/244* (2013.01); *B32B 2250/40* (2013.01); *F05D 2250/283* (2013.01); *F05D 2260/96* (2013.01)

(58) Field of Classification Search
CPC ................................. F02C 7/24; F02C 7/045
See application file for complete search history.

(56) References Cited

U.S. PATENT DOCUMENTS

| | | |
|---|---|---|
| 6,371,242 B1 | 4/2002 | Wilson et al. |
| 9,334,059 B1 | 5/2016 | Jones et al. |
| 10,322,470 B2 | 6/2019 | Jones et al. |

(Continued)

FOREIGN PATENT DOCUMENTS

| | | |
|---|---|---|
| CA | 2916411 C | 2/2021 |
| CN | 105458262 A | 4/2016 |

(Continued)

OTHER PUBLICATIONS

Howerton, B.M. and Jones, M.G. (2016). Acoustic Liner Drag: Measurements on Novel Facesheet Perforate Geometries. AIAA 2016-2979. May 27, 2016. pp. 1-12.

(Continued)

*Primary Examiner* — Sabbir Hasan
(74) *Attorney, Agent, or Firm* — Carlson, Gaskey & Olds, P.C.

(57) ABSTRACT

An acoustic treatment for use in an acoustic treatment for a gas turbine engine includes a sheath having a plurality of perforations. A plurality of cell structures extends from the sheath such that the sheath and the cell structures are a monolithic component. The plurality of perforations of the sheath are formed by filaments of a first material that define a first dimension of the perforations having a linear edge and filaments of a second material crossing the filaments of the first material that define a second dimension of the perforations having a linear edge. Such perforations have a non-cylindrical shape defined by the linear edges of the filaments of the first material and the filaments of the second material. A gas turbine engine is also disclosed.

9 Claims, 8 Drawing Sheets

(51) Int. Cl.
 B33Y 80/00 (2015.01)
 B32B 9/04 (2006.01)

(56) References Cited

U.S. PATENT DOCUMENTS

| | | | |
|---|---|---|---|
| 10,343,320 | B2 | 7/2019 | Gardiner |
| 10,720,135 | B2 | 7/2020 | Herrera |
| 10,889,098 | B2 | 1/2021 | Yamazaki et al. |
| 10,894,353 | B2 | 1/2021 | Gardner et al. |
| 10,928,742 | B2 | 2/2021 | Shores et al. |
| 11,110,662 | B2 | 9/2021 | Newell |
| 11,111,808 | B2 | 9/2021 | Mardjono et al. |
| 11,135,763 | B2 | 10/2021 | Beyerle et al. |
| 11,286,859 | B2 | 3/2022 | Geertsema et al. |
| 11,478,981 | B2 | 10/2022 | Mardjono et al. |
| 11,480,106 | B2 | 10/2022 | Morin et al. |
| 2018/0036946 | A1 | 2/2018 | Barton et al. |
| 2018/0345376 | A1 | 12/2018 | Page |
| 2019/0184641 | A1 | 6/2019 | Swier et al. |
| 2020/0156323 | A1 | 5/2020 | Woytowitz et al. |
| 2020/0207018 | A1 | 7/2020 | Arnon et al. |
| 2020/0324482 | A1 | 10/2020 | Taig et al. |
| 2020/0353673 | A1 | 11/2020 | Mardjono et al. |
| 2020/0384695 | A1 | 12/2020 | Mardjono et al. |
| 2021/0017089 | A1 | 1/2021 | Thrasher et al. |
| 2021/0101330 | A1 | 4/2021 | Hikmet |
| 2021/0332760 | A1 | 10/2021 | Gangloff, Jr. et al. |
| 2021/0394432 | A1 | 12/2021 | Lalonde et al. |
| 2022/0084493 | A1* | 3/2022 | Bifulco .............. F01D 9/02 |
| 2022/0161486 | A1 | 5/2022 | Miller et al. |
| 2022/0266516 | A1 | 8/2022 | Korshikov et al. |
| 2022/0266527 | A1 | 8/2022 | Negugogor et al. |
| 2022/0274316 | A1 | 9/2022 | Okamoto et al. |
| 2022/0379565 | A1 | 12/2022 | Negugogor et al. |
| 2022/0389882 | A1 | 12/2022 | Lin et al. |
| 2023/0080827 | A1 | 3/2023 | McNaney |
| 2023/0265251 | A1 | 8/2023 | Yoshimura et al. |
| 2024/0351699 | A1* | 10/2024 | Desjoyeaux .......... F02C 7/045 |

FOREIGN PATENT DOCUMENTS

| | | |
|---|---|---|
| EP | 2977601 A1 | 1/2016 |
| GB | 2391059 A | 1/2004 |
| NL | 2021916 | 5/2020 |
| WO | 2022/009690 A1 | 1/2022 |
| WO | 2022/231420 A1 | 11/2022 |

OTHER PUBLICATIONS

European Search Report for EP Application No. 24179272.0 dated Oct. 16, 2024.
European Search Report for EP Application No. 24179366.0 dated Nov. 5, 2024.
European Search Report for EP Application No. 24179392.6 dated Nov. 5, 2024.

* cited by examiner

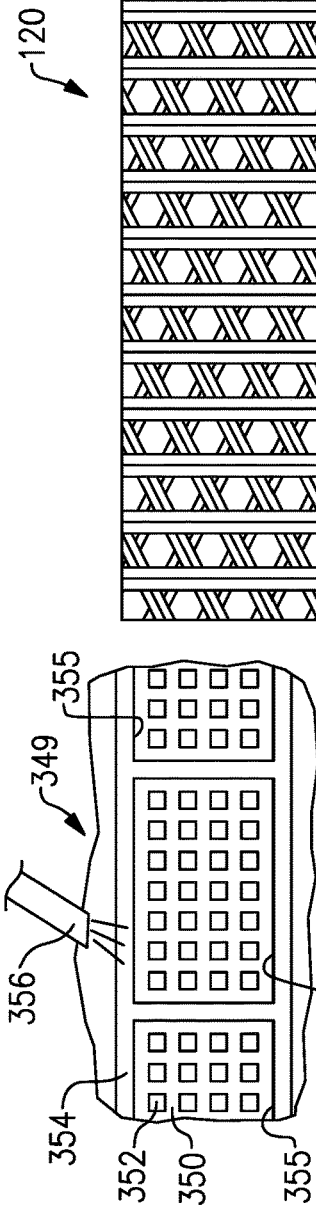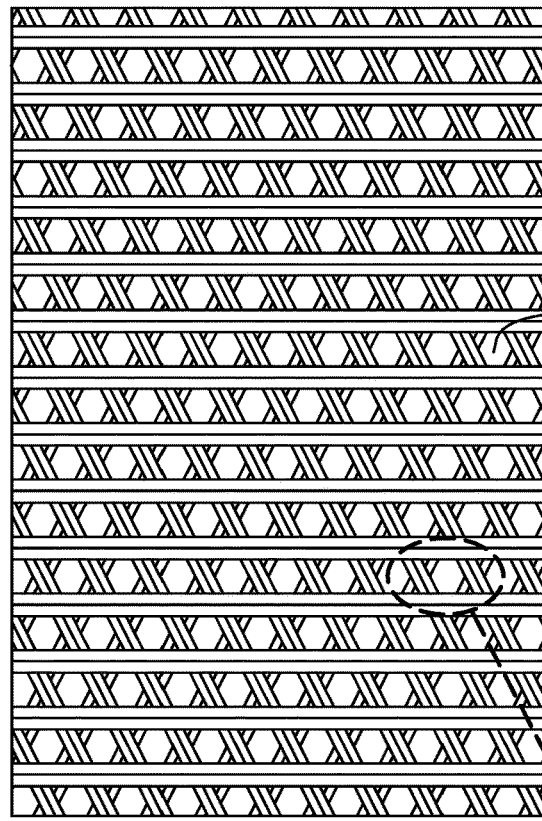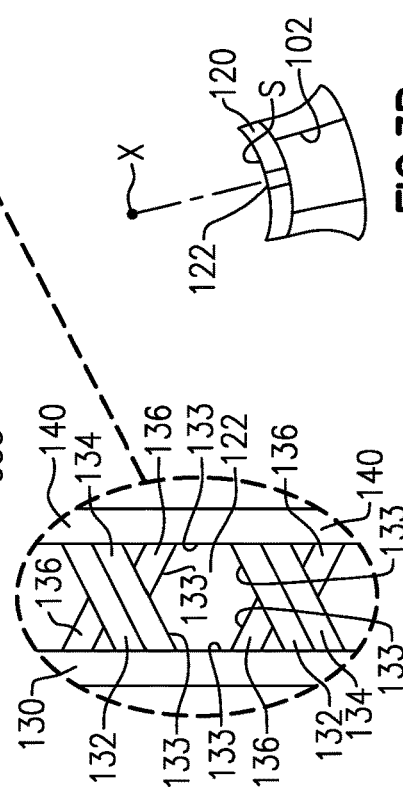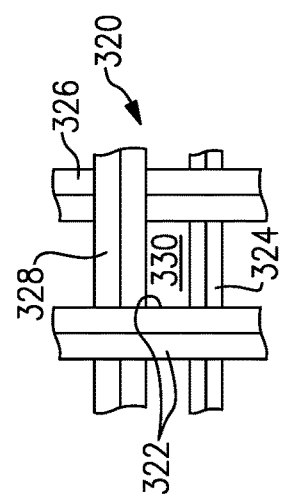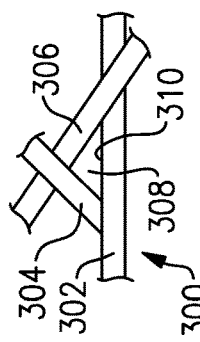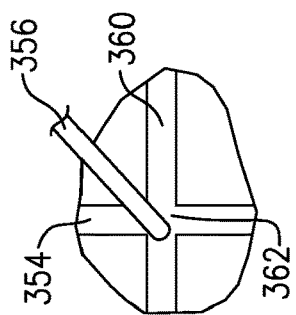

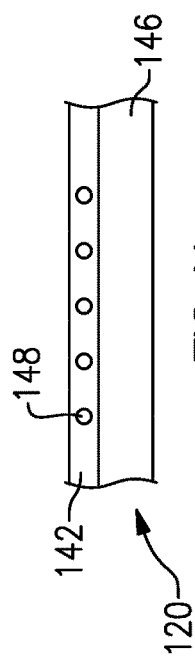
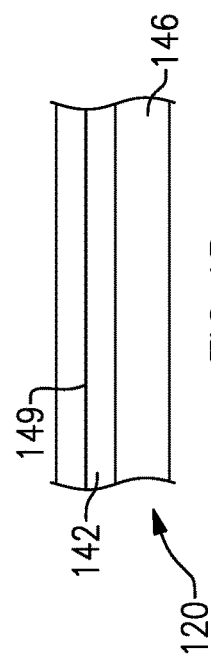
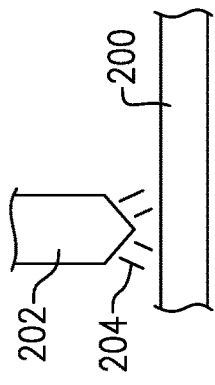
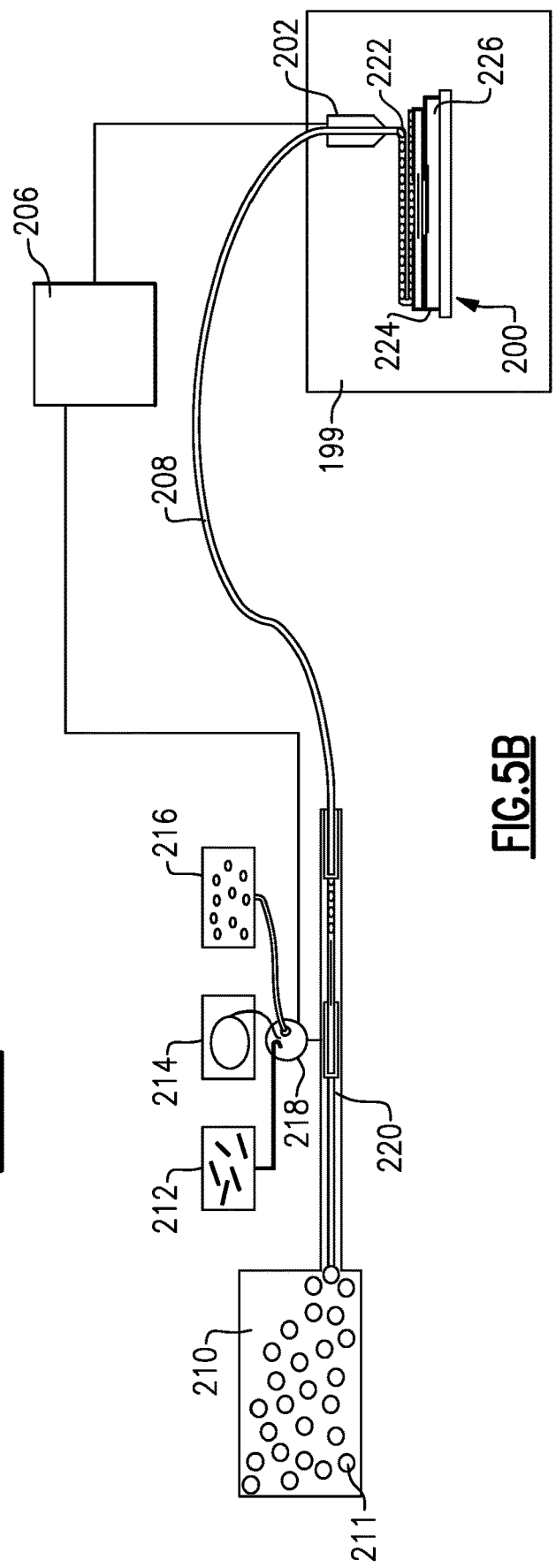

ACOUSTIC TREATMENT MADE BY ADDITIVE MANUFACTURING

BACKGROUND OF THE INVENTION

This application relates to an acoustic liner for use in a gas turbine engine formed to have a unique physical shape.

Gas turbine engine are known, and typically include a fan delivering air into a bypass duct as propulsion air and into a core engine. Air in the core engine reaches a compressor, and compressed air is delivered into a combustor. The compressed air is mixed with fuel and ignited, and products of that combustion passes downstream over turbine rotors driving them to rotate. The turbine rotors in turn drive compressor and fan rotors.

As known, gas turbine engines, and particularly those utilized on aircraft, raise noise challenges. Thus, it is known to include acoustic treatment on surfaces in the gas turbine engine.

One such surface is the interior of a fan case defining one extent of the bypass duct. A known acoustic treatment (also referred to as a liner) includes a layer of cell structures, such as honeycomb shaped structures, and an outer perforated sheath covering the cell structures.

There have been challenges on designing the acoustic liners to have perforations as would be most desired. It would also be advantageous to design a monolithic acoustic liner for ease of manufacturer as prior art acoustic liners comprise one or more materials such as a polymeric cell structure with a metal perforated sheath.

SUMMARY OF THE INVENTION

In a featured embodiment, an acoustic treatment for use in an acoustic treatment for a gas turbine engine includes a sheath having a plurality of perforations. A plurality of cell structures extends from the sheath such that the sheath and the cell structures are a monolithic component. The plurality of perforations of the sheath are formed by filaments of a first material that define a first dimension of the perforations having a linear edge and filaments of a second material crossing the filaments of the first material that define a second dimension of the perforations having a linear edge. Such perforations have a non-cylindrical shape defined by the linear edges of the filaments of the first material and the filaments of the second material.

In another embodiment according to the previous embodiment, the monolithic component of the sheath and plurality of cell structures is made by material extrusion.

In another embodiment according to any of the previous embodiments, the monolithic component of the sheath and plurality of cell structures is curved about a central axis. The perforations extend through the component in a radial direction relative to the central axis.

In another embodiment according to any of the previous embodiments, the first material and the second material of the sheath are the same.

In another embodiment according to any of the previous embodiments, the perforations of the sheath are aligned to be spaced apart from a wall of the cell structures.

In another embodiment according to any of the previous embodiments, areas of additional strength are provided by in-fill materials added into a base material.

In another embodiment according to any of the previous embodiments, the infill materials include chopped fibers.

In another embodiment according to any of the previous embodiments, the chopped fibers include synthetic fibers.

In another embodiment according to any of the previous embodiments, the infill materials include a continuous fiber.

In another embodiment according to any of the previous embodiments, the infill materials include beads.

In another embodiment according to any of the previous embodiments, the open cells are generally rectangular.

In another embodiment according to any of the previous embodiments, the open cells are honeycombed shape.

In another embodiment according to any of the previous embodiments, the sheath includes a monolayer.

In another embodiment according to any of the previous embodiments, the sheath is formed by a plurality of filament portions extending along at least a first axis of a three-dimensional space. Others of the filaments cross the first plurality of filaments and extend in a direction with at least a component along second and third axes in the three-dimensional space.

In another featured embodiment, a gas turbine engine includes a fan delivering air into a bypass duct defined in part by a fan case as bypass air. A fan duct surrounds the fan. The fan also delivers air into a compressor section. The compressor section delivers air into a combustor. A turbine section is mounted downstream of the combustor to receive products of combustion and to drive the fan and a compressor rotor. There is an interior surface of the fan case. The interior surface includes an acoustic treatment having a cell with the acoustic treatment having a sheath having a plurality of perforations. A plurality of cell structures extends from the sheath such that the sheath and the cell structures are a monolithic component. The plurality of perforations of the sheath are formed by filaments of a first material that define a first dimension of the perforations having a linear edge and filaments of a second material crossing the filaments of the first material that define a second dimension of the perforations having a linear edge. Such perforations having a non-cylindrical shape defined by the linear edges of the filaments of the first material and the filaments of the second material.

In another embodiment according to any of the previous embodiments, distinct radial areas are defined within a radial thickness of the sheath. The material of the treatment includes different characteristics in different areas.

In another embodiment according to any of the previous embodiments, there are areas of increased strength with lower strength in other areas.

In another embodiment according to any of the previous embodiments, the open cells are generally rectangular.

In another embodiment according to any of the previous embodiments, the open cells are honeycombed shape.

In another embodiment according to any of the previous embodiments, the sheath is formed by a plurality of filament portions extending along at least a first axis of a three-dimensional space. Others of the filaments cross the first plurality of filaments and extend in a direction with at least a component along second and third axes in the three-dimensional space.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 3A shows a liner with a perforated sheath made according to the teachings of this disclosure.

FIG. 3B shows a detail of the FIG. 3A liner.

FIG. 3C shows an alternative embodiment liner.

FIG. 3D shows yet another alternative embodiment liner.

FIG. 3E shows a method of forming another alternative embodiment.

FIG. 3F shows a detail of the FIG. 3E embodiment.

FIG. 3G shows an optional method.

FIG. 4A shows a feature that could be incorporated into a liner such as the FIG. 3 liner.

FIG. 4B shows another embodiment.

FIG. 5A shows a step in forming a liner with the feature of FIG. 4A or B.

FIG. 5B shows a system for forming the FIG. 4A or B liner.

DETAILED DESCRIPTION

Figure 1:
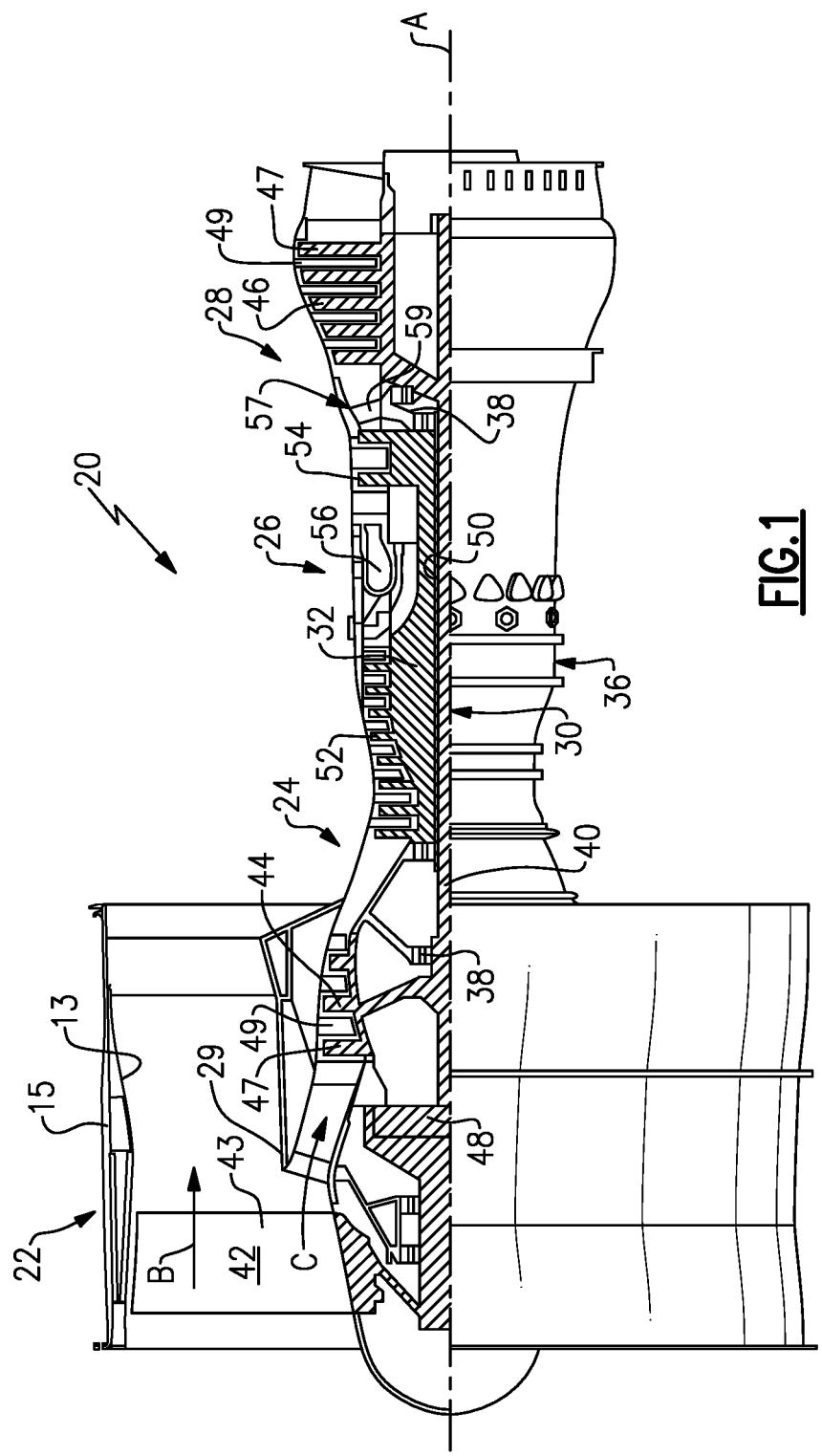
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram }°R)/(518.7\ °R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
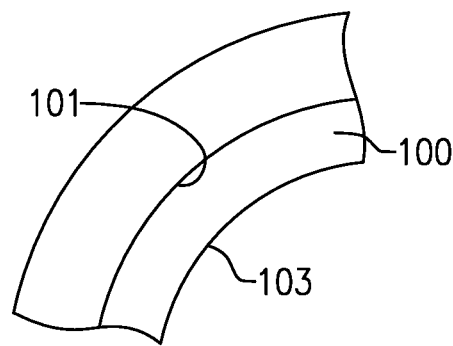
FIG. 2A shows a feature utilized in engines.

FIG. 2A shows an acoustic treatment 100 which is utilized in engines at an interior surface 101 such as a fan case within housing 15 as shown in FIG. 1.

Figure 2B:
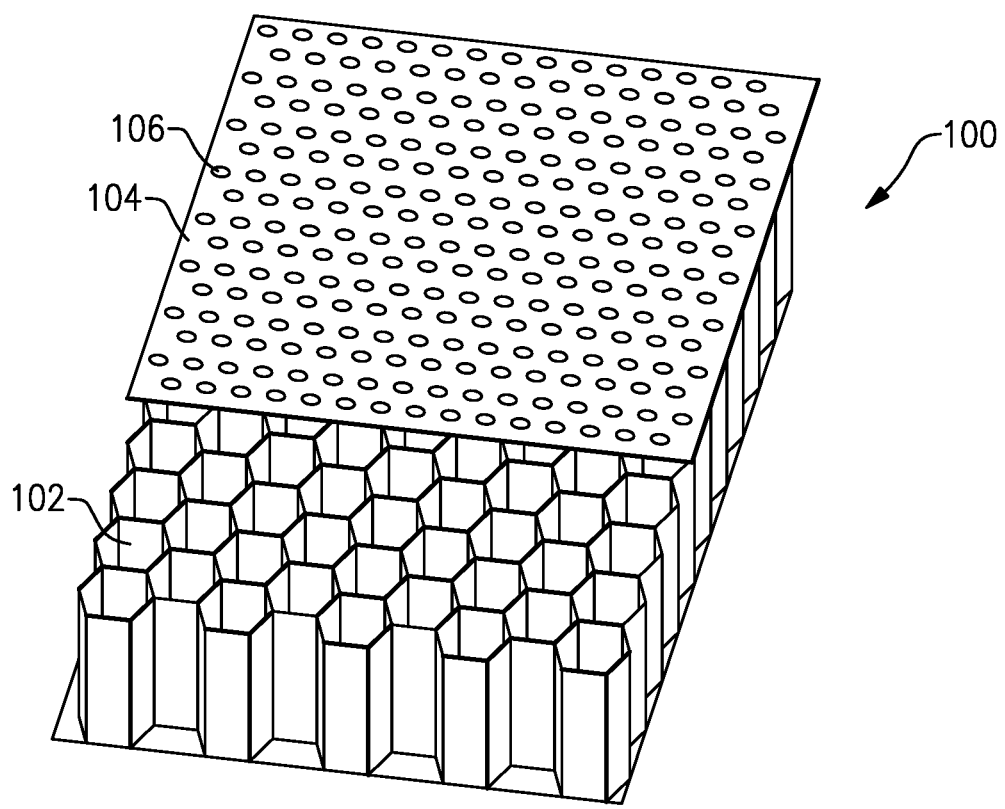
FIG. 2B shows the structure of an acoustic treatment as utilized in the FIG. 2A surface.

As shown in FIG. 2B, the acoustic treatment 100 includes a layer of cells 102 which extend for a greater radial distance than the thickness of a covering sheath 104. The covering sheath 104 has a plurality of perforations 106 which communicate air from an inner peripheral surface 103 of the acoustic treatment 100 into the cells 102. The acoustic treatment is designed to reduce or eliminate noise that may otherwise emanate from the engine. The liner of FIG. 2B does not fully illustrate the disclosed concept as the perforations 106 would not be cylindrical, but would tend to have linear edges as described below. However, it does show an acoustic treatment 100 having an integral perforated sheath 104 and a cellular body having open cells 102. In FIG. 2B those cells are shown to be honeycomb as an exemplary embodiment.

This disclosure describes forming the cells 102 and sheath 104 using additive manufacturing techniques such as material extrusion to create a monolithic structure for case of manufacturing with advantages such as preferred placement of the perforations in the sheath in relation to the cell walls, to reduced crosstalk between the cells, reduce drag, and provide localized functionality.

FIG. 3A shows a liner 120 which has a plurality of perforations 122. Rather than forming the perforations themselves by depositing material around the desired location and forming a cylindrical perforation, this disclosure utilizes a plurality of filaments 132, 134, and 136 deposited in an overlaying pattern to create the perforations thereby controlling the size and shape of the perforations to achieve a desired percentage of open area. Additional filaments may also be utilized. As shown, filaments 130 and 140 extend parallel to each other, as do filaments 132 and 134. As the layers of filaments are laid across and/or atop another layer, what is left is the perforation 122. As can be seen, the perforation 122 does not have a cylindrical cross-section, but rather has a plurality of linear edges 133. As can be appreciated, additional filaments can cross in a different direction to make the perforation 122 of any desired shape and size. Moreover, the more filaments that are utilized, the more linear edges the perforation 122 will have, approaching a cylindrical shape. Still, a cylindrical shape will never be reached with the disclosed liner 120. As the size of the perforations 122 decrease in size to be micro-perforations of less than 10 thousandths of an inch, smaller perforations decrease drag in the component.

The multidirectional filaments allows fine control over a design point of such liners. Namely, there is a desired percentage of perforation per area of liner which has sometimes been difficult to achieve with additive manufacturing. With the liner of FIG. 3A, it is easier to achieve any desired perforation percentage.

As shown in FIG. 3B, the liner 120 has inner surfaces curved about a central axis X, and the perforations 106 extend through the liner 120 in a radial direction relative to the central axis. Axis X may be the rotational axis of an associated engine.

FIG. 3C shows another liner embodiment 300. Here filaments 302, 304 and 306 cross to define internal triangular shaped perforations 308. Again, the perforations 308 are defined by linear edges 310.

FIG. 3D shows yet another embodiment 320. Here there are crossing filaments 322, 324, 326 and 328. Each of these filaments are shown as a double layer. They together define a rectangular shaped perforation 330 having a slot shape with linear edges 332.

The disclosed liner and method of this application forms the cells and perforated sheath as a one-piece component utilizing additive manufacturing, and in particular material extrusion, utilizing one or more types of filament materials.

FIG. 3E shows a method of forming a component such as the component 100, or a component 349. Component 349 has a perforated sheath 350 and open cells 355. Here, the open cells 355 are rectangular. The perforations 352 are shown covering the open cells 355. The open cells 355 are formed by a plurality of walls 354, and an additive manufacturing tool, and in particular a material extrusion tool 356, is shown laying down materials to form the walls 354 of cells 355. In a preferred method, the sheath 350 is initially formed with the perforations 352, and then cell walls 354 are formed on the sheath.

As shown in FIG. 3F, the perforations 352 may be formed above the walls 354, but that is not necessary, and would only be done as a manufacturing convenience. However, one can appreciate a width of the walls 354 is greater than a width of the perforation 352. It is not advantageous to have a perforation 352 extending across two adjacent open cell areas 355. Preventing the sheath perforations from contacting the cell walls 354 reduces or eliminates the cross talk between the cells 355 to improve the effectiveness of the liner 349.

FIG. 3G shows another feature wherein crossing filaments 354 and 360 are used in forming a monolayer of the same or different filaments. A filament 354 is initially deposited and an additive manufacturing tool 356 is shown depositing a crossing filament 360 of the same or a different material. The initial deposit of at least two of filaments 354 defines a primary width of the perforation. The tool path utilized by the additive manufacturing tool, or nozzle 356, would deposit the subsequent filaments 360 in the same plane as the filament 354 to define the length or other edges of the perforation. Thus, at an intersection 362, the previously described linear edges may bulge out slightly because the nozzle depositing the subsequent filament pushes through the first filament material 354 while remaining in the same print layer. The size of the perforations can be created to less than 10 mils, preferably less than 5 mils, due to the ability to deposit the filaments as close together as possible in the same plane. The filament thickness, as dictated by the nozzle orifice size, allows the ability to create micro-perforations in the sheath defined by at least the width created by the distance between the filaments 354 and the length created by the distance between the filaments 356. This technique will result in a thinner final component which may be desirable, particularly for use in an acoustic liner.

In yet embodiment, the liner can be tailored to have a heterogeneous pattern of perforations to accommodate varying air flow direction and acoustic performance requirements within the same component.

In a preferred embodiment, the acoustic treatments are formed from a thermoplastic, and more narrowly a polycarbonate. One possible material is available under the trademark ULTEM® and commercially available from a number of different manufacturers and distributors.

FIG. 4A shows another feature which can be optionally incorporated into the FIG. 3A sheath. In FIG. 4A, the liner 120 has radial inner area 142 and radial outer area 146. As shown in this embodiment, there are chopped fibers 148, which may be formed of a strength adding synthetic fiber such as an aramid fiber sold under the tradename KEV- LAR® and commercially available from a number of different manufacturers and distributors. It is known that the radial inner surface of an acoustic liner is subject to impacts such as bird strikes, etc. Incorporating such strengthening fibers increases the durability of the acoustic liner. FIG. 4B shows yet another feature comprising a layer 142 having a continuous fiber 149 is deposited therein, which can be an electrical or signaling member. The features illustrated in FIGS. 4A and 4B may be used for forming any number of other components. Distinct radial areas can be defined within a radial thickness of the liner, and the material of the liner (or other component) may include different characteristics or functionality in different areas.

FIG. 5A shows a formation of an intermediate part 200. A nozzle 202 is shown depositing material 204 onto underlying intermediate layers. Part 200 may become a liner such as the liners of FIG. 3A, or FIGS. 4A and 4B, or any other part. The method of FIG. 5A may use material extrusion, and other than as disclosed in the following paragraphs, known material extrusion techniques may be utilized.

As shown in FIG. 5B, a system 208 is forming intermediate part 200, which may be an acoustic liner as disclosed above, but could be any number of other components. A nozzle 202 is shown depositing material, such as a filament, and a control 206 controls the nozzle 202, and a feed assembly.

The controller 206 is programmed to operate the methods described herein. The feed assembly includes a hopper 210 receiving beaded media 211, which may be consist of the material that will form the majority of the component 200. An extruder 220 receives and melts the beaded media 211. The extruder 220 also communicates with a plurality of optional infill materials 212, 214 and 216. The extruder 220 will include a screw-like member to mix the infill materials as they pass towards nozzle 202.

As shown in FIG. 5B, the material deposition occurs in a furnace 199. As an example, the furnace may be heated to a temperature of about 300° C. or at a working temperature wherein the entire deposition is completed or close to completed before any, or a significant portion, of the component fully solidifies.

A valve 218 can be activated by the controller 206 to selectively deliver one, none, or a plurality of the infill materials. The infill materials are illustrated as chopped fibers 212, a continuous fiber 214 or beaded or particulate matter 216. As shown, the component 200 has areas 222, 224 and 226, which may comprise filaments. Incorporating infill materials may be utilized to form a component such as the parts of FIG. 4A or 4B which have different infill materials in different areas. The area 222 may receive glass beads, whereas the area 224 may receive chopped fibers, and the area 226 may not receive any infill material. The continuous fiber may be utilized for any number of purposes including depositing electrical or signaling devices within the component to be formed.

By using materials and/or incorporating different infill materials, the acoustic liner may have customized areas of differing coefficients of thermal expansion, varying degrees of durability and or specific mechanical properties in a single monolithic structure. As another example, if one wanted to provide a sacrificial area to the overall component, the mechanical properties could be reduced locally. Details and claims of this method are disclosed in a co-pending United States Patent Application entitled "MATERIAL EXTRUSION WITH SELECTIVELY ADDED INFILL MATERIAL" filed on even date herewith, and by the Applicant of this application, and now identified as Ser. No. 18/326,513.

Figure 6A:
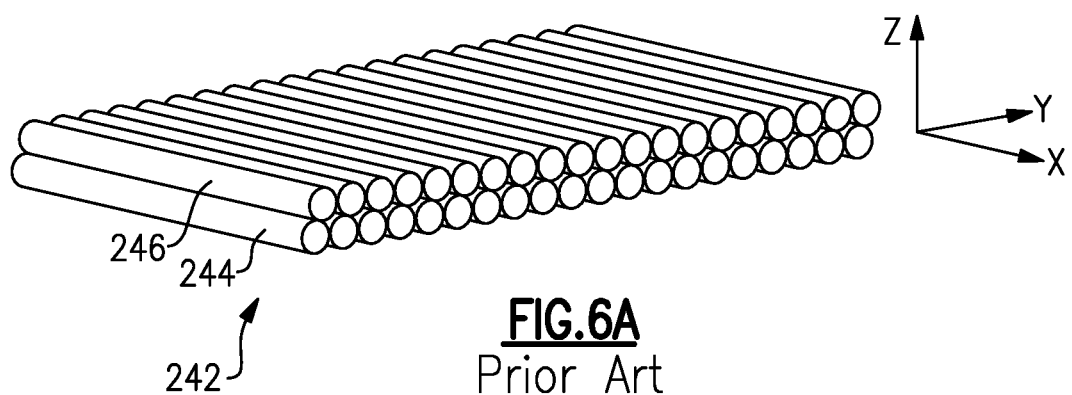
FIG. 6A shows a challenge in forming surfaces with prior art material extrusion processes.
Figure 6B:
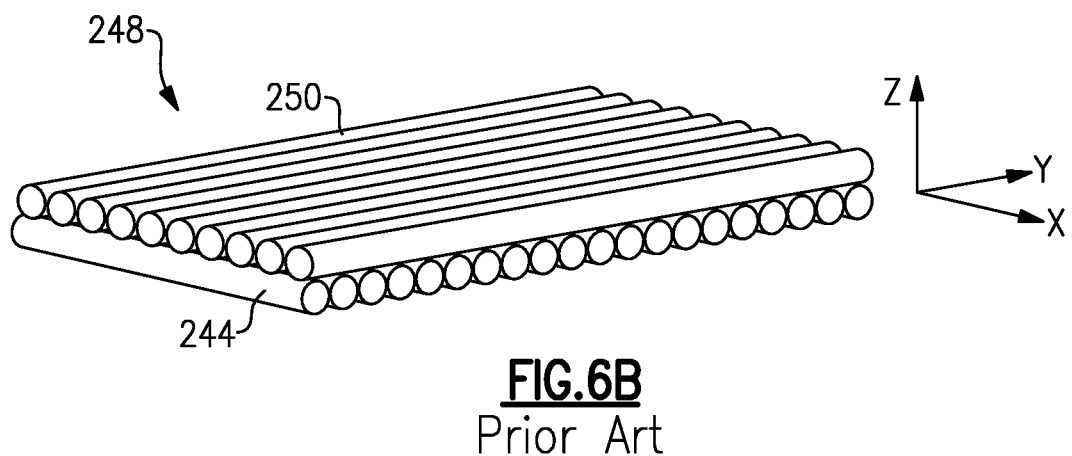
FIG. 6B shows a second prior art material extrusion process.
Figure 7A:
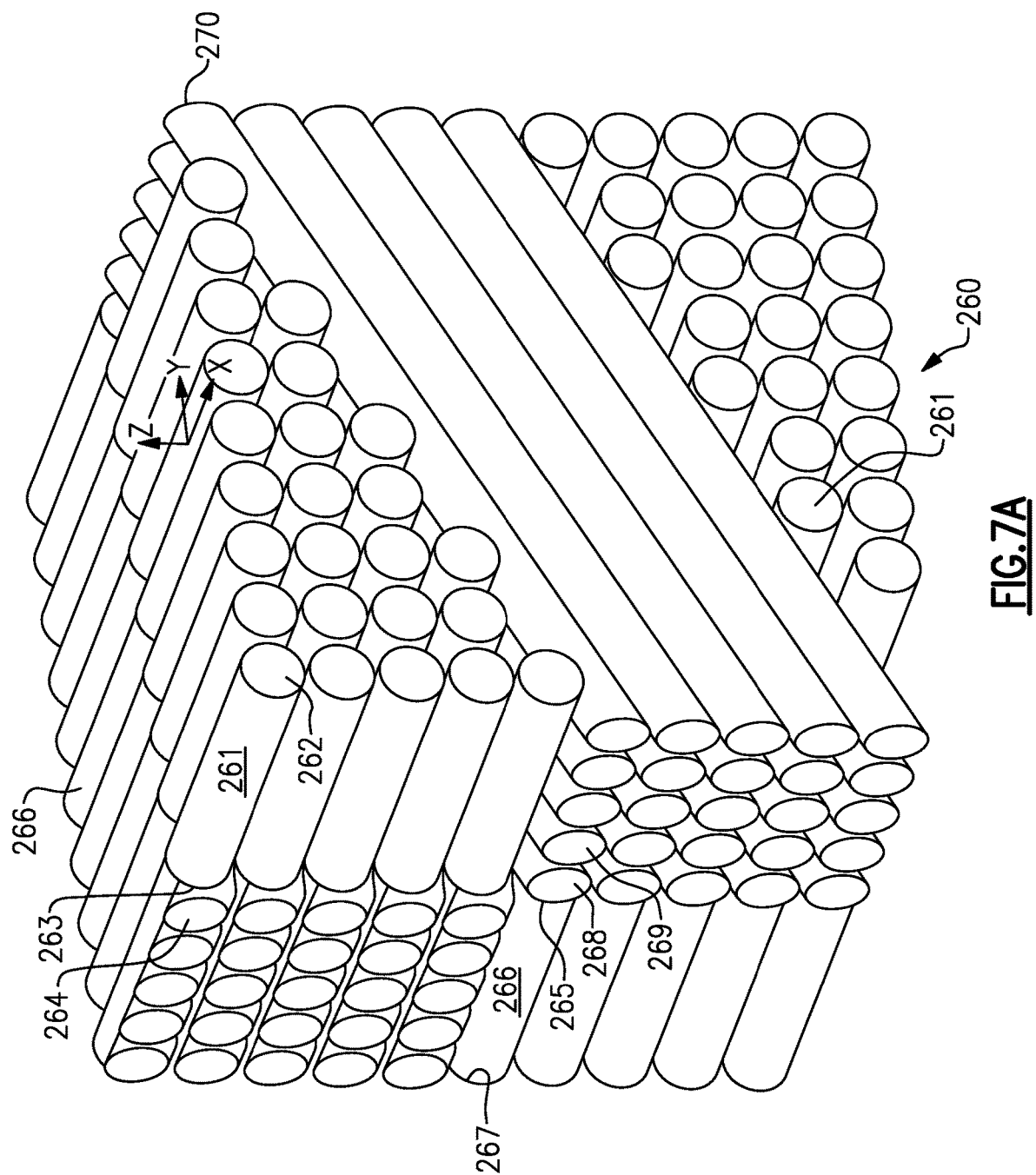
FIG. 7A shows modifications of the formation of products utilizing further teachings of this disclosure.

In yet another embodiment, a structure shown in FIG. 7A can be made using the system and method described herein having increased strength along multiple axes. A prior art structure shown in FIG. 6A shows a first material 242 which may be formed utilizing prior art material extrusion processes. Here there are layers 244 and 246 laid down in a single direction along an axis X. Such an arrangement provides good strength along the X axis, but undesirably low strength along the Y and Z axes, as there are interlayer planes that provide weak spots. Similarly, a prior structure as shown in FIG. 6B shows a distinct material 248 having layers 244 extending along the X axis with layers 250 extending along the Y axis. While such an arrangement would increase the strength in the Y axis and maintaining good strength characteristics along the X axis there would still be weakness in the Z axis.

FIG. 7A illustrates a cell structure arrangement 260 which provides good strength along each of the x, y and z axes achieved by the non-planar method of material extrusion discussed above. Layer portions 261 extend along the X axis between ends 262 and 263. Similarly, there are other layer portions 266 extending between ends 265 and 267. Crossing layers 264 extend in a direction with a component in both the Z and Y direction. The layers 264 end up outward of an end of portions 266, and also adjacent the axial end 263 of the layer portions 261. In this embodiment, the layer portions 264 extend with a component in a downward direction and to the left (in the negative Z axis and the Y axis). Then, other crossing layers 268 extend from end 269 to an end 270. As can be seen, the layers extend in the Y axis but in the positive Z axis. The interfitting of the layers in this manner, with layer portions 261 and 266 generally extending along a first dimension and other crossing layers extending in a direction having at least a component in the other two of the three dimensional axes.

Figure 7B:
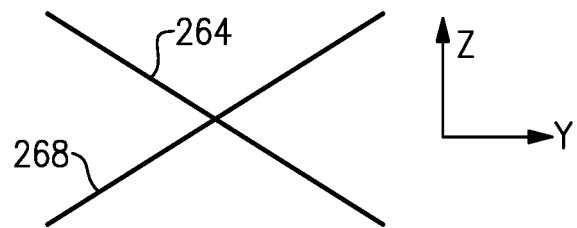
FIG. 7B shows a feature of the FIG. 7A embodiment.

As shown in FIG. 7B, the layer portions 268 extend in a direction with a positive component along the Z axis whereas the layer portions 264 extend along a direction with the component in the opposed direction along the Z axis such that there are crossing layers that cross each other, although spaced by intermediate planar portions 261 and 266.

Figure 7C:
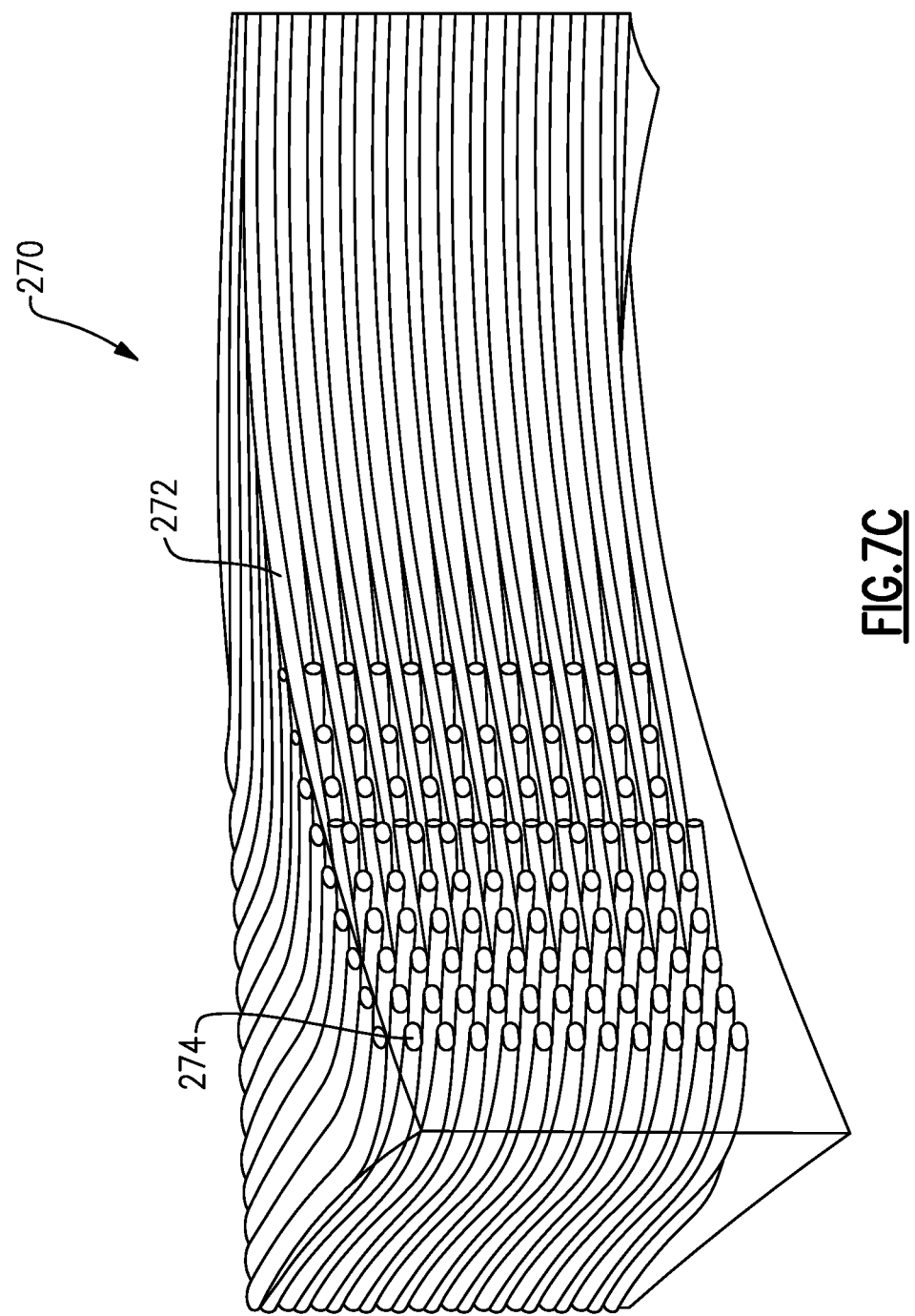
FIG. 7C shows a further non-planar modification.

FIG. 7C shows a curved component 270 wherein there are filaments 272 curving among two or even three axes to form a final curved outer surface. Crossing members 274 may also curve along all three axes.

Details and claims of the methods are disclosed in a co-pending United States Patent Application entitled "NON-PLANAR TOOLPATHS FOR MATERIAL EXTRUSION HAVING CROSSING TOOLPATHS" filed on even date herewith, and by the Applicant of this application, and now identified as Ser. No. 18/326,500.

Figure 8:
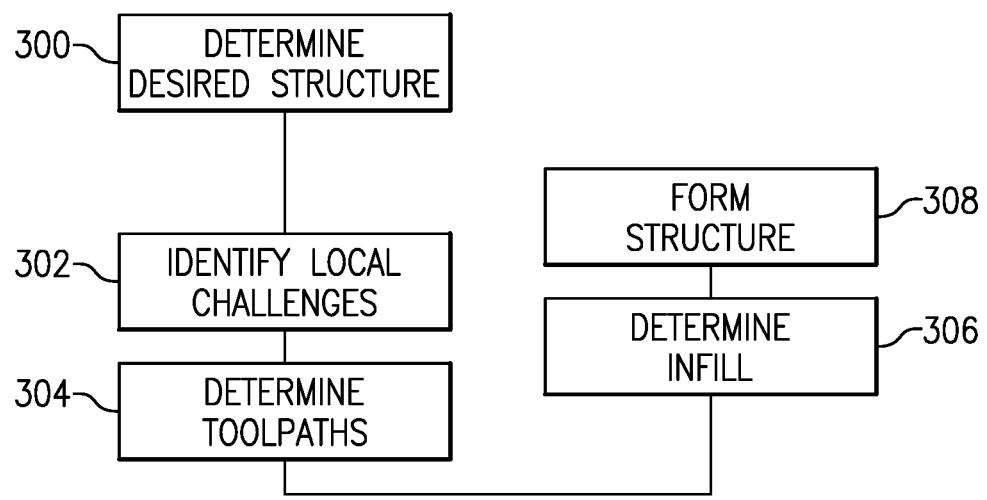
FIG. 8 is a flow chart of methods disclosed here.

FIG. 8 shows a flow chart for the methods of this disclosure. At step 300 a desired structure is determined. At step 302 any local challenges within the structure are identified. This might include areas which are subject to impact such as the inner periphery of a liner, or other areas having local challenges such as relatively high stress compared to adjacent areas. At step 304 toolpaths are determined, such as disclosed above. At step 306, a determination is made as to whether infill of a secondary material into a primary material is indicated. At step 308 the structure is formed, and may include the depositing of crossing filaments such as described with regard to FIG. 7A.

An acoustic treatment for use in an acoustic treatment for a gas turbine engine under this disclosure could be said to include a sheath having a plurality of perforations. A plurality of cell structures extends from the sheath such that the sheath and the cell structures are a monolithic component. The plurality of perforations of the sheath are formed by filaments of a first material that define a first dimension of the perforations having a linear edge and filaments of a second material crossing the filaments of the first material that define a second dimension of the perforations having a linear edge. Such perforations have a non-cylindrical shape defined by the linear edges of the filaments of the first material and the filaments of the second material.

Although embodiments of an apparatus and method have been disclosed, a worker of skill in this art would recognize that modifications would come within the scope of this disclosure. For that reason, the following claims should be studied to determine the true scope and content of this disclosure.

What is claimed is:

1. An acoustic treatment for use in an acoustic treatment for a gas turbine engine comprising:
    a sheath having a plurality of perforations;
    a plurality of cell structures extending from the sheath such that said sheath and said cell structures are a monolithic component, wherein the plurality of perforations of the sheath are formed by filaments of a first material that define a first dimension of the perforations having a linear edge and filaments of a second material crossing the filaments of the first material that define a second dimension of the perforations having a linear edge, such perforations having a non-cylindrical shape defined by the linear edges of the filaments of the first material and the filaments of the second material;
    wherein the perforations of the sheath are aligned to be spaced apart from a wall of the cell structures; and
    wherein strong areas of additional strength in at least one of said sheath and said plurality of cell structures are provided by in-fill materials added into a base material.

2. The acoustic treatment as set forth in claim 1, wherein the infill materials include chopped fibers.

3. The acoustic treatment as set forth in claim 2, wherein the chopped fibers include synthetic fibers.

4. The acoustic treatment as set forth in claim 1, wherein the infill materials include a continuous fiber.

5. The acoustic treatment as set forth in claim 1, wherein the infill materials include beads.

6. A gas turbine engine comprising:
    a fan delivering bypass air into a bypass duct defined in part by a fan case as bypass air, a fan duct surrounding said fan;
    the fan also delivering core air into a compressor section, and the compressor section delivering air into a combustor, a turbine section mounted downstream of said combustor to receive products of combustion and to drive the fan and a compressor rotor;
    there being an interior surface of said fan case, and the interior surface including an acoustic treatment having a cell with the acoustic treatment having a sheath having a plurality of perforations;
    a plurality of cell structures extending from the sheath such that said sheath and said cell structures are a monolithic component, wherein the plurality of perforations of the sheath are formed by filaments of a first material that define a first dimension of the perforations having a linear edge and filaments of a second material crossing the filaments of the first material that define a second dimension of the perforations having a linear edge, the plurality of such perforations having a non-cylindrical shape defined by the linear edges of the filaments of the first material and the filaments of the second material;
    wherein strong areas of additional strength in at least one of said sheath and said plurality of cell structures are provided by in-fill materials added into a base material;
    wherein distinct radial areas are defined within a radial thickness of the sheath, and the material of the acoustic treatment including different characteristics in different areas; and
    wherein there being areas of increased strength with lower strength in other areas.

7. The gas turbine engine as set forth in claim 6, wherein the open cells are generally rectangular.

8. The gas turbine engine as set forth in claim 6, wherein the open cells are honeycombed shape.

9. The gas turbine engine as set forth in claim 6, wherein the sheath is formed by the filaments including a plurality of filament portions extending along at least a first axis of a three-dimensional space, and others of the filaments crossing the first plurality of filaments and extending in a direction with at least a component along second and third axes in the three-dimensional space.

* * * * *